(12) United States Patent
Vergnes et al.

(10) Patent No.: US 8,572,298 B2
(45) Date of Patent: Oct. 29, 2013

(54) ARCHITECTURE TO CONNECT CIRCUITRY BETWEEN CUSTOMIZABLE AND PREDEFINED LOGIC AREAS

(75) Inventors: Alain Vergnes, Trets (FR); Raphael Robert, Puyloubier (FR)

(73) Assignee: Atmel Corporation, San Jose, CA (US)

( * ) Notice: Subject to any disclaimer, the term of this patent is extended or adjusted under 35 U.S.C. 154(b) by 313 days.

(21) Appl. No.: 11/668,405

(22) Filed: Jan. 29, 2007

(65) Prior Publication Data

US 2008/0183938 A1    Jul. 31, 2008

(51) Int. Cl.
  *G06F 3/00*   (2006.01)
  *G06F 5/00*   (2006.01)
  *G06F 13/00*  (2006.01)
  *G06F 13/14*  (2006.01)
  *G06F 13/28*  (2006.01)

(52) U.S. Cl.
  USPC ............... 710/36; 710/51; 710/38; 710/107; 710/305; 710/316; 711/163

(58) Field of Classification Search
  USPC ......... 710/36, 38, 51, 107, 305, 316; 711/163
  See application file for complete search history.

(56) References Cited

U.S. PATENT DOCUMENTS

| | | | | |
|---|---|---|---|---|
| 4,771,462 A | * | 9/1988 | Hannan et al. | 380/44 |
| 5,787,299 A | * | 7/1998 | Ostler et al. | 712/39 |
| 5,878,142 A | * | 3/1999 | Caputo et al. | 713/159 |
| 6,145,069 A | * | 11/2000 | Dye | 711/170 |
| 6,819,271 B2 | * | 11/2004 | Geiger et al. | 341/51 |
| 6,993,610 B2 | * | 1/2006 | Coffey et al. | 710/74 |
| 7,370,310 B1 | * | 5/2008 | Saini et al. | 716/16 |
| 2004/0034768 A1 | * | 2/2004 | Poldre | 713/153 |
| 2008/0288785 A1 | * | 11/2008 | Rao et al. | 713/190 |

OTHER PUBLICATIONS

A Reprogrammable Gate Array and Applications Stephen Trimberger Preceedings of the IEEE, vol. 81, No. 7, Jul. 1993.*
FPGA Implementations of the ICEBERG Block Cipher Standaert et al.*

* cited by examiner

*Primary Examiner* — Henry Tsai
*Assistant Examiner* — Eric Oberly
(74) *Attorney, Agent, or Firm* — Fish & Richardson P.C.

(57) ABSTRACT

An integrated circuit comprises a predefined logic area including a microprocessor coupled to a plurality of peripheral devices including an external bus interface over a system bus. A customizable logic area is accessible by the microprocessor over the system bus. A first I/O bus sends data to an external device. A second I/O bus receives data from an external device. A first set of multiplexers in the predefined logic area have first inputs coupled to an output of the external bus interface, second inputs coupled to the customizable logic area, and an output coupled to a first I/O bus. A second set of multiplexers in the predefined logic area have first inputs coupled to the customizable logic area, second inputs coupled to the second I/O bus, and an output coupled to an input of the external bus interface.

21 Claims, 7 Drawing Sheets

ARCHITECTURE TO CONNECT CIRCUITRY BETWEEN CUSTOMIZABLE AND PREDEFINED LOGIC AREAS

BACKGROUND OF THE INVENTION

1. Field of the Invention

The present invention relates to micro-controller integrated circuits including a customizable logic area and a predefined logic area that are accessible via the microprocessor. More particularly, the present invention relates to architecture to make connections between the customizable area and the predefined logic areas.

2. The Prior Art

Due to the wide variety of available software applications, it is difficult to design a standard microcontroller product that includes all possible modules to efficiently address these applications. The application specific integrated circuit (ASIC) market addresses that need by allowing a user to specify custom modules. The initial development cost of an ASIC remains expensive. A known work-around consists of adding a customizable area of logic to an already predefined microcontroller logic, the customizable area being formed as a field programmable gate array or other logic that can be customized by, for example, modifying the metal interconnect layers. This last solution is a trade-off between the size of the logic, which is smaller than FPGA area for an equivalent function, and a front-end cost including the design of the metal layer, and one time customization cost.

In such a prior-art architecture, the predefined logic implements a microcontroller function that cannot be modified but contains access points that connect to the customizable logic area. These access points are generally the system bus of the microcontroller.

Referring now to FIG. 1, an illustrative prior-art architecture of this type is shown. A basic micro-controller architecture 10 including a customizable logic module includes the microprocessor 12 that executes a set of instructions that can be stored outside the integrated circuit in a memory device (not shown) which is controlled by the external bus interface (EBI) 14 that communicates with the external memory via EBI bus portions 16 and 18 as is known in the art. The set of instructions may also be located in a ROM or Embedded Flash acting as an on-chip memory 20. An address decoder module 22 selects one module from among all possible modules coupled to a system bus 24 over select lines 26, 28, 30, or 32 as is known in the art. The system bus 34 includes (not shown) an address bus, a write data bus, a read data bus and control signals such as read/write. Among the modules commonly encountered in such a system are an interrupt controller 36 and a UART 38 that sends and receives signals via I/O 40. A customizable area 42 may be included to allow a user to implement a custom function in the system. Customizable area 42 may send and receive signals via I/O 44. Clock terminal 46 supplies a clock signal to time all the modules and reset terminal 48 supplies a reset signal to initialize all the modules.

The microprocessor 12 executes instructions that can be stored outside the chip by driving the address bus 34 to a value corresponding to the EBI module 14. The address decoder 22 asserts the corresponding selection signal 26. To fetch the instruction, the direction control (read/write) signal of the system bus is asserted for read operation mode. The value can be either logical 1 or 0 depending on the system bus protocol. The EBI module 14 then drives the external memory device to obtain the data required by the microprocessor 12. EBI bus portion 16 is driven by the EBI module 14, and by the address and control signal set. The off-chip memory returns the instruction to be executed on EBI bus portion 18. The EBI module returns the instruction data value on internal system bus 34 and the microprocessor 12 is then ready to execute the instruction.

If the instruction is a write instruction to one of the modules coupled to the system bus 34, the microprocessor 12 performs another similar fetch to obtain the destination address of the peripheral device to which the data must be written. The microprocessor 12 then executes the write instruction to the selected peripheral by asserting on the system address bus a value selecting (for example) the UART module 38. The address decoder 22 deselects the EBI 14 by clearing the associated selection signal 32 and asserts the selection signal 28 corresponding to the UART module 38.

Being selected for a write operation, the UART module 38 writes into its internal registers the value on the write data bus portion of system bus 34. The other modules receive this value but do not take any action because they are not selected. The UART module 38 converts the parallel internal stored data to a bit stream that is clocked out on I/O 40.

The instructions are sequentially executed and perform read or write operations on the system bus. The microprocessor 12 can also be triggered by a peripheral using the interrupt line 50 driven by the interrupt controller 36, which handles the priorities of the interrupt lines 52 and 54 coming from peripheral modules 38 and 42. For example if the expected result from a peripheral is known to have a latency of several tens of clock cycle, it is better to trigger the interrupt line rather than wait for the result by executing some kind of no-operation instruction, especially when several peripherals, such as UARTs and crypto-processors, have a long latency response compared to the clock cycle period.

The customizable logic area 42 can be designed using an FPGA-based architecture. Therefore this logic will be able to be programmed in the field. The architecture can also be gate-array based. In this case, for the same area, the cell density is much more higher than in an FPGA, but the functionality can be defined only once. To obtain the desired function, the metal layers must be designed according to the cells (gates) available on the gate array. In the gate array, the placement of the gates is always the same whatever the functionality.

As a consequence, it is cheaper to design a new microcontroller with this method rather than by generating a full masks reticle for each new circuit. Only the last layers are redesigned and manufacture time is significantly reduced.

The customizable logic area 42 needs to be connected to predefined logic to be accessible by the microprocessor 12. Therefore, the system bus 34 communicates with customizable logic 42. For example, if the system bus 34 selects data using non-tristate cells (i.e. multiplexers using NAND or other gates), these multiplexers will have dedicated inputs that will be driven by circuitry in the customizable logic area 42. To read data from the customizable logic, the multiplexers located in the predefined logic must have dedicated inputs to receive data from the customizable logic. When a circuit is embedded in the customizable area, it is likely that read access to this circuit will be needed. In such a case, the dedicated inputs of the predefined logic multiplexers will be driven by the customized circuitry. But it is also possible to employ a circuit that requires only write access. In this case it is mandatory for an architecture such as shown in FIG. 1 or a similar architecture to tie the dedicated inputs of predefined logic multiplexers to a known logical value (GROUND or VDD) to avoid CMOS floating inputs as is known in the art.

This can be done, of course, only in the customizable area to avoid the need to modify the layout of the predefined logic.

To address as many applications as possible, several sources of interrupt are taken into account in the customizable area. Three sources are shown in FIG. 1. If the customer has a module using a single interrupt source, the two remaining interrupt lines must be tied to ground to render them inactive. Again this must be done in the customizable area to avoid the need to modify the layout of the predefined logic.

The same idea applies for the address decoder 22. Several signals 30 from the address decoder 22 are already decoded and routed to the customizable logic area 42. This kind of routing is necessary to enable the microprocessor 12 to gain access to the customizable logic area 42.

Due to increasing requests on embedded security features including, but not limited to protect privacy, to keep the firmware from being copied, there is a need to protect information that is being processed by the circuit. The data that are internally processed are difficult to analyze because it is difficult to gain internal access using non-intrusive methods, and therefore may be more difficult to be copied. But when an external bus interface 14 exists to provide an interface to large off-chip memories, it may be very important to encrypt data prior to driving it onto the PAD buffers for I/O 16 and 18. The ciphering algorithm must be kept secret for each original equipment manufacturer to maintain the privacy of the intellectual property such as firmware or other embedded software.

This issue applies only to transfers between the microcontroller and off-chip memories (serial/parallel) and not for point to point communication links where data are ciphered to keep from being read while in transfer by a third party that may be connected on the same communication network. In such a case the ciphering algorithm is standard in order to provide the ability to communicate with any remote terminal. Individual keys must be known by both sender and recipient to perform correct data exchanges.

BRIEF DESCRIPTION OF THE INVENTION

The invention defines specific access points to provide more flexibility, especially in the domain of security. For example, if the predefined area contains an external memory controller (SRAM, SDR/DDR-SDRAM, Flash), the signals exchanged with the external memory device are not passed directly from/to the pad buffers but rather are sent to multiplexers that can be configured by software to redirect the signals to the customizable area. This will allow the final user to add a scrambling and descrambling function to the existing memory controller without designing an additional memory controller. This scrambling/descrambling function is an example of circuitry that cannot be embedded into the predefined area because its goal is to make individual circuits different from one other.

According to one aspect of the invention, an integrated circuit comprises a predefined logic area including a microprocessor coupled to a plurality of peripheral devices including an external bus interface over a system bus. A customizable logic area is accessible by the microprocessor over the system bus. A first I/O bus sends data to an external device. A second I/O bus receives data from an external device. A first set of multiplexers in the predefined logic area have first inputs coupled to an output of the external bus interface, second inputs coupled to the customizable logic area, and an output coupled to a first I/O bus. A second set of multiplexers in the predefined logic area have first inputs coupled to the customizable logic area, second inputs coupled to the second I/O bus, and an output coupled to an input of the external bus interface. The outputs of the external bus interface are connected to the customizable logic. The second IO bus is also connected to the customizable logic area. The select inputs of multiplexers are defined via user software.

According to another aspect of the invention, an integrated circuit comprises a predefined logic area including a microprocessor coupled to a plurality of peripheral devices over a system bus, at least one of the peripheral devices comprising an external bus interface having access to input and output buffers. A customizable logic area is accessible by the microprocessor over the system bus. A first I/O bus sends data to an external device. A second I/O bus receives data from an external device. A first bus couples output signals from the external bus interface to the customizable logic area. A second bus has programmable connections to the first bus in a region of the customizable logic area where multiplexers can be configured, and couples signals to the first I/O bus. A third bus couples input signals from the second I/O bus to the customizable logic area. A fourth bus has programmable connections to the third bus in a region of the customizable logic area where multiplexers can be configured, and couples signals to the external bus interface.

According to another aspect of the invention, an integrated circuit comprises a predefined logic area including a microprocessor coupled to a plurality of peripheral devices over a system bus, at least one of the peripheral devices comprising an external bus interface having access to input and output buffers. A customizable logic area is accessible by the microprocessor over the system bus. A first I/O bus sends data to an external device. A second I/O bus receives data from an external device. A first bus couples output signals from the external bus interface to the customizable logic area. A second bus has direct connections to the first bus in the customizable logic area, and couples signals to the first I/O bus. A third bus couples input signals from the second I/O bus to the customizable logic area. A fourth bus has direct connections to the third bus in the customizable logic area, and couples signals to the external bus interface.

According to another aspect of the invention, an integrated circuit comprises a predefined logic area including a microprocessor coupled to a plurality of peripheral devices over a system bus. A customizable logic area is accessible by the microprocessor over the system bus. A first I/O bus is coupled to an external bus interface for sending data to an external device. A second I/O bus is coupled to the external bus interface for receiving data from an external device. A first set of multiplexers is in the predefined logic area and has a first input coupled to the system bus, a second input coupled to the customizable logic area, and an output coupled to the external bus interface. A second set of multiplexers is disposed in the predefined logic area and has a first input coupled to the external bus interface and customizable area, a second input coupled to the customizable logic area, and an output coupled to the system bus.

According to another aspect of the invention, an integrated circuit comprises a predefined logic area including a microprocessor coupled to a plurality of peripheral devices over a system bus. A customizable logic area is accessible by the microprocessor over the system bus. A first I/O bus is coupled to an external bus interface and sends data to an external device. A second I/O bus coupled to the external bus interface and receives data from an external device. A first bus couples output signals from the system bus to the customizable logic area. A second bus has programmable connections to the first bus in a region of the customizable logic area where multiplexers can be configured, and couples signals to the external bus interface. A third bus couples input signals from the external bus interface to the customizable logic area. A fourth bus has programmable connections to the third bus in a region of the customizable logic area where multiplexers can be configured, and couples signals to the system bus.

According to another aspect of the invention, an integrated circuit comprises a predefined logic area including a microprocessor coupled to a plurality of peripheral devices over a system bus. A customizable logic area is accessible by the microprocessor over the system bus. A first I/O bus is coupled to an external bus interface and sends data to an external device. A second I/O bus is coupled to the external bus interface and receives data from an external device. A first bus couples output signals from the system bus to the customizable logic area. A second bus has direct connections to the first bus in the customizable logic area, and couples signals to the external bus interface. A third bus couples input signals from the external bus interface to the customizable logic area. A fourth bus has direct connections to the third bus in the customizable logic area, and couples signals to the system bus.

BRIEF DESCRIPTION OF THE DRAWING FIGURES

DETAILED DESCRIPTION OF THE INVENTION

Persons of ordinary skill in the art will realize that the following description of the present invention is illustrative only and not in any way limiting. Other embodiments of the invention will readily suggest themselves to such skilled persons.

The scrambling/ciphering function to be embedded in the customizable area acts in transparent mode for the software application running on the circuit (except during the initialization phase or during operation if the scrambling key or algorithm needs to be modified). The scrambling function may act at different stages within the predefined architecture.

Figure 1:
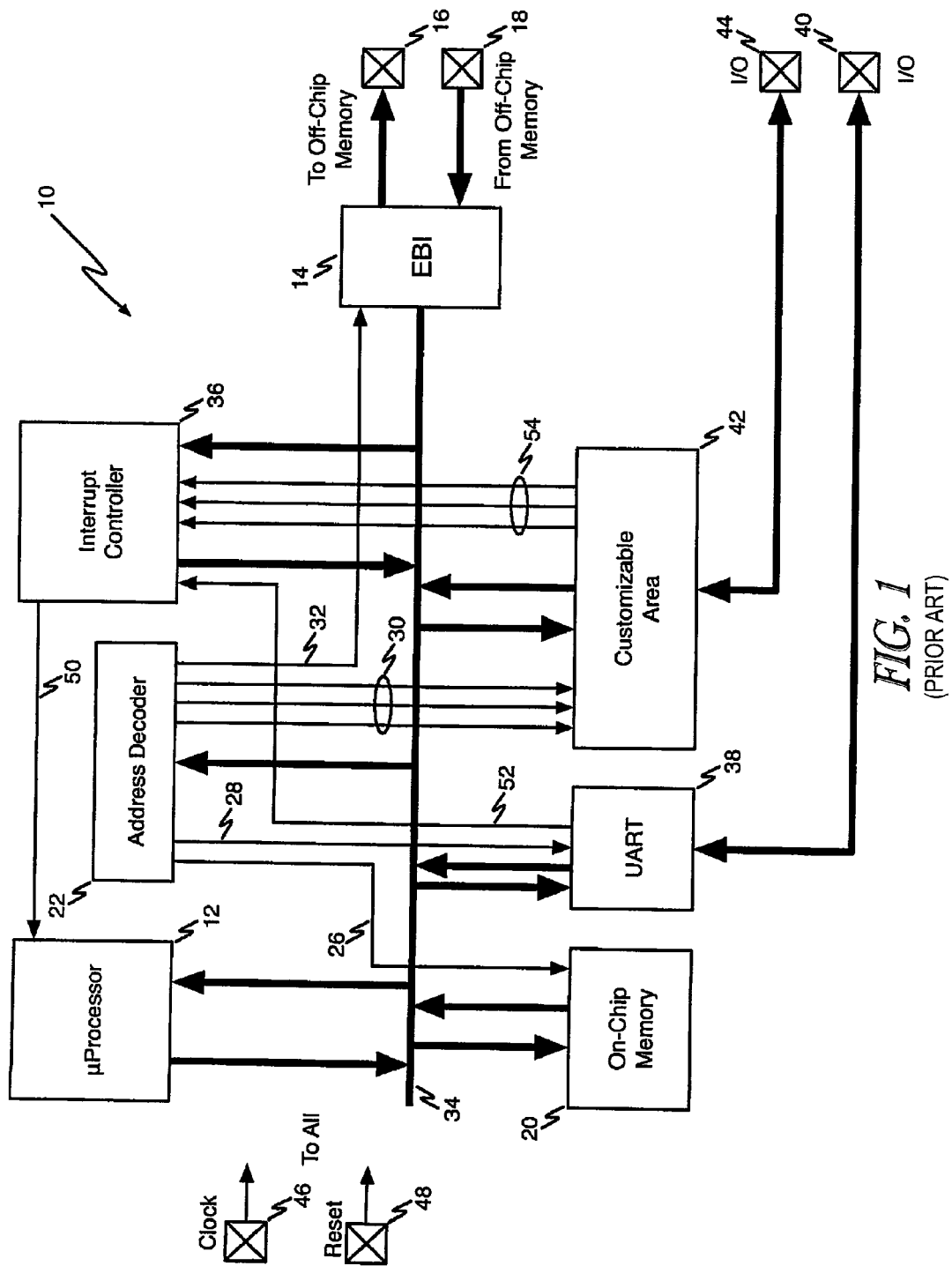
FIG. 1 is a block diagram of a generic micro-controller architecture with customizable logic module in which the present invention may be employed.
Figure 2:
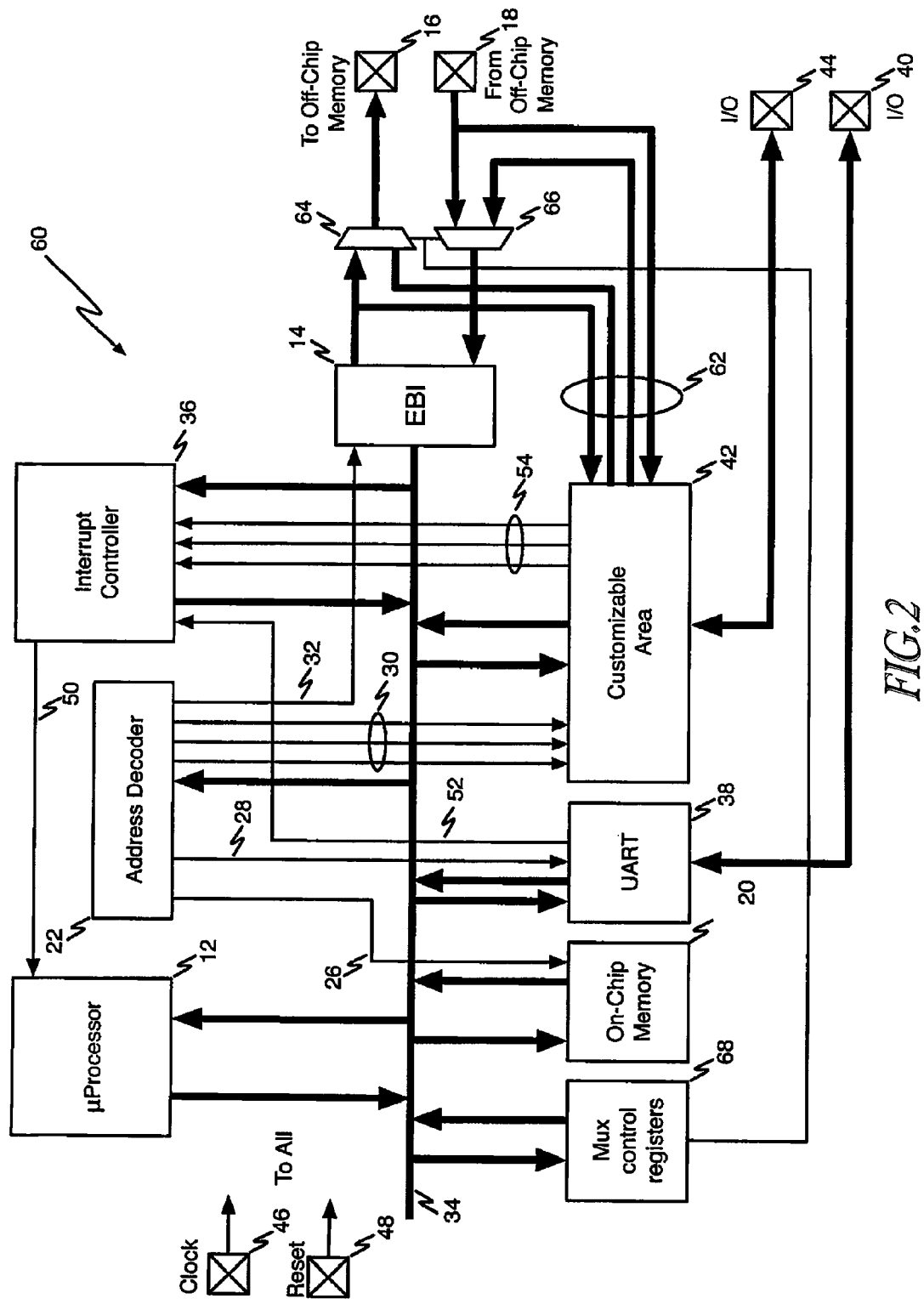
FIG. 2 is a block diagram illustrating a first example of an architecture according to the present invention in which a function may be inserted between the EBI and its associated I/O.

Referring first to FIG. 2, a first example of an architecture 60 according to the present invention employs a selection for a function, such as a scrambling/de-scrambling function, inserted between the EBI 14 and the I/O 16 and 18. Elements in FIG. 2 performing the same function as corresponding elements in FIG. 1 will be designated by the same reference numerals used for the corresponding elements in FIG. 1.

To make this insertion possible for some customers and keep the direct path from EBI 14 to I/O 16 and I/O 18 available for other customers, there is a need for predefined nets 62 to route data from the EBI to the customizable area and multiplexers 64 to select the data driving the I/O 16 from between the EBI 14 and the customizable logic area 42. In the reverse direction, the data from I/O 18 needs to be routed to the customizable logic area by means of predefined nets 62 and there is a need for a set of multiplexers 66 to provide either a direct path from I/O 18 to EBI 14 or EBI 14 through the customizable logic area 42 after it has been processed (e.g., unscrambled) in the customizable logic area 42.

The multiplexers 64 and 66 select inputs may be driven in many ways. If the scrambling (or other) function can be enabled or disabled through a software user interface, then it is possible to provide a multiplexer control register module 68 accessible by the microprocessor 12 through the system bus 34 and its associated address decoding in the predefined logic area. The output of the multiplexer control register 68 drives the select inputs of multiplexers 64, 66.

Figure 3:
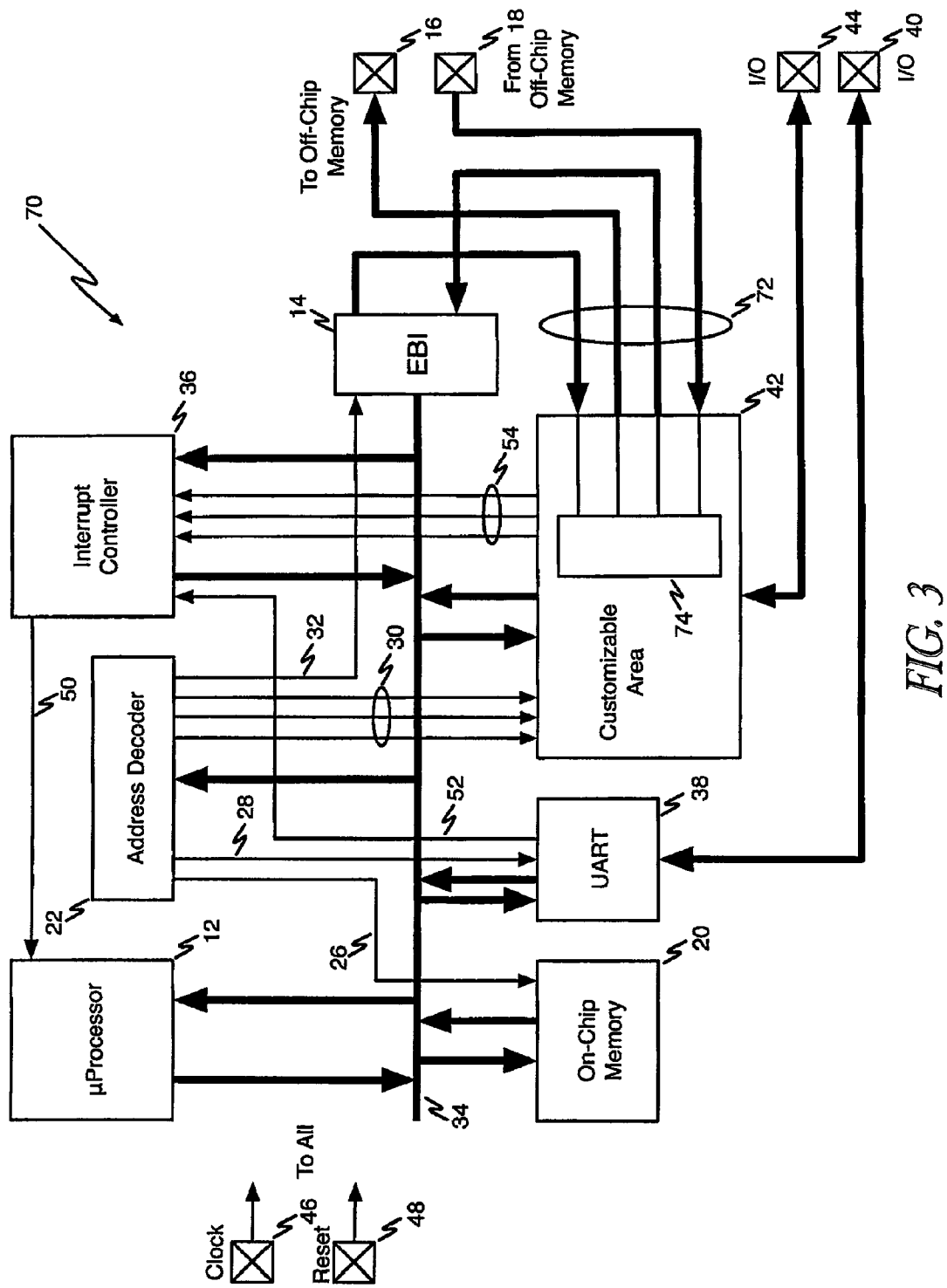
FIG. 3 is a block diagram illustrating a second example of an architecture according to the present invention in which a function may be inserted between the EBI and its associated I/O located between the EBI and its associated PADS, wherein all logic for the function is located in the customizable logic area.

Referring now to FIG. 3, a second example of a microcontroller architecture 70 according to the present invention is shown in block diagram form. The illustrative embodiment shown in FIG. 3 also allows a function such as encrypting/decrypting, to be located between EBI 14 and its associated I/O 16 and 18. Elements in FIG. 3 performing the same function as corresponding elements in FIG. 1 will be designated by the same reference numerals used for the corresponding elements in FIG. 1.

As is shown in FIG. 3, if it is desired to have a capability to provide an access to the customizable area to obtain a scrambling function, the architecture may be configured so that some nets of the predefined area are routed to the customizable area and vice versa. It will still be possible to locate the architecture of the present invention between the EBI 14 and its associated I/O 16 and 18 and multiplexers to the predefined logic by configuring the multiplexers 64 and 66 of FIG. 2 into the encrypting module formed in the customizable logic area 42. It is also possible to design the configuration register logic (to enable/disable the scrambling/descrambling function) into the customizable logic area because it is already accessible by software via the system bus. According to this embodiment of the present invention, the chip manufacturer provides access to and from the customizable logic area 42 at strategic points of the predefined logic, shown diagrammatically as nets 72. These nets may be programmably connected to block 74 in customizable logic area 42 configured to implement the encryption/decryption circuitry and the multiplexers.

In the architecture of the present invention described with reference to FIG. 3 located between the EBI 14 and its associated I/O 16 and 18, all encrypting/decrypting logic is located in the customizable logic area 42. Because the direct path is provided by multiplexers located in the customizable area (especially module 74), the interconnect wires may be longer than the embodiment shown in FIG. 2. As a consequence, the propagation delay may be longer and the maximum frequency at which the system can operate may be lower for circuits having an equivalent area and architecture.

Figure 4:
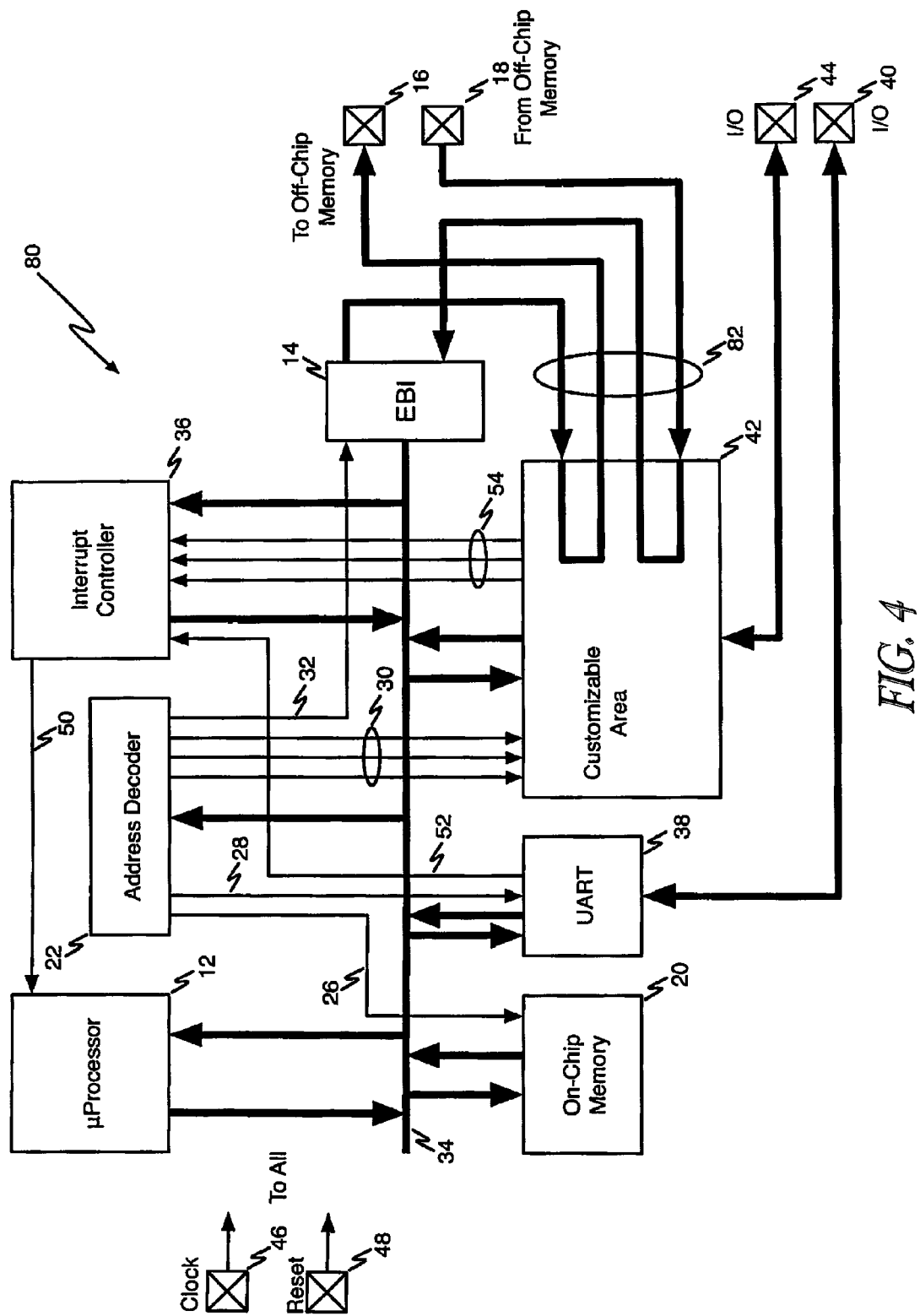
FIG. 4 is a block diagram illustrating a third example of an architecture according to the present invention in which connectivity is provided between the EBI and its associated I/O, without an intervening function located in the customizable logic area.

Referring now to FIG. 4, Invention located between EBI and its associated PADS, all scrambling logic located into customizable area a second example of a microcontroller architecture 80 according to the present invention is shown in block diagram form. The illustrative embodiment shown in FIG. 4 does not provide for a function such as encrypting/decrypting, to be located between EBI 14 and its associated I/O 16 and 18. Elements in FIG. 4 performing the same function as corresponding elements in FIG. 1 will be designated by the same reference numerals used for the corresponding elements in FIG. 1.

As shown in the embodiment of FIG. 4, when the encryption/decryption or other function is not required, the customizable logic area 42 will contain a set of interconnect wires 82 and 84 to directly reconnect the EBI 14 to its associated I/O 16 and 18. Of course the customizable logic area 42 may implement other functions that are not required to be in the signal path between EBI 14 and its associated I/O 16 and 18. For example, a second UART (not shown) may be embodied in customizable logic area 42.

To provide security features, the encrypting/decrypting function may be placed at another location. The encrypting/decrypting function may be placed between the system bus 34 and the EBI 14. Such an illustrative embodiment is shown with reference to FIG. 5, in which elements performing the same function as corresponding elements in FIG. 1 will be designated by the same reference numerals used for the corresponding elements in FIG. 1.

Figure 5:
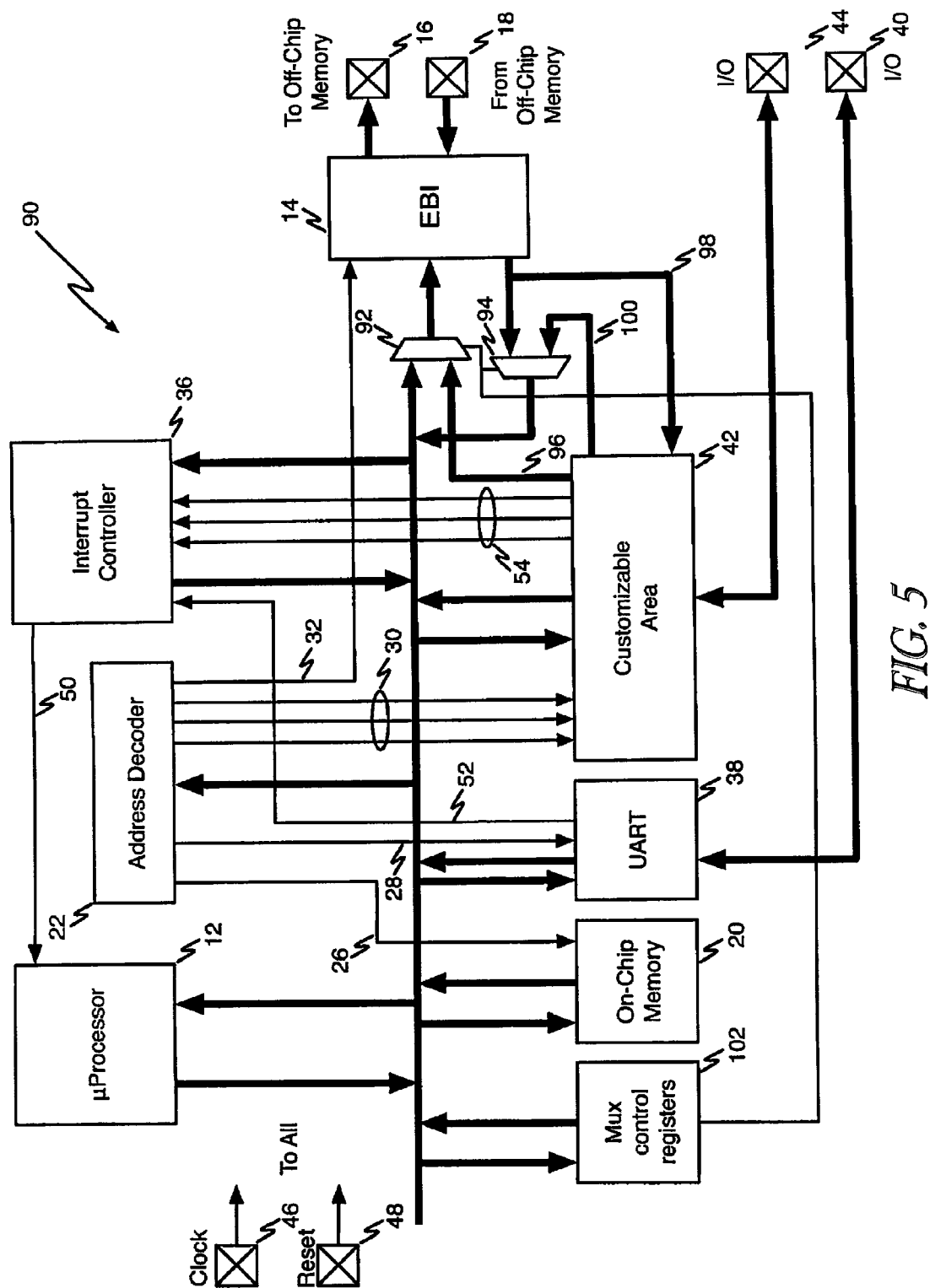
FIG. 5 is a block diagram illustrating a fourth example of an architecture according to the present invention in which the added functionality is located between the system bus and the EBI, in which the multiplexer interfaces are located in the predefined logic.

Referring now to FIG. 5, multiplexers 92 and 94 are interposed between system bus 34 and EBI 14. Multiplexer 92 drives EBI 14 with either the contents of the system bus 34 or output 96 from the customizable logic area 42. A signal path 98 is provided from EBI 14 to the customizable logic area 42. Multiplexer 94 drives the system bus 34 from either the EBI 14 or output 100 from the customizable logic area 42. Multiplexers 92 and 94 may be controlled by software as is known in the art by multiplexer control registers 102.

In the illustrative embodiment depicted in FIG. 5, the number of I/O terminals to be designated for the customizable area is reduced compared to embodiments of the invention where this function is located between the EBI 14 and its associated I/O 16 and 18, because the customizable logic area 42 is already connected to the system bus.

The multiplexers 92 and 94 allow the encrypting/decrypting function (embedded in customizable logic area 42) to be enabled when the signal 104 from multiplexer control registers 102 is high or disabled when this signal is low. Considering the example of an encrypting/decrypting function that encrypts the data carried on system bus 34. System bus 34 is a set of busses including a write-data bus carrying data from microprocessor 12 to the EBI 14, the interrupt controller 36, the UART 20, the customizable logic area 42 and the multiplexer control registers 102. The other bus is a read-data bus carrying the data from these devices to the microprocessor 12. As will be appreciated by persons of ordinary skill in the art, there is a set of multiplexers for the read data bus (not shown). An address bus carries the address from microprocessor 12 to all of these devices and to address decoder 22.

When the microprocessor 12 writes a data into the off-chip memory (not shown) the data is carried on the system bus 34 and reaches the input of multiplexer 92 as well as the input of customizable logic area 42. If the customizable logic area 42 is designed to encrypt the read data bus and provide the resulting data (scrambled) on bus 96, the multiplexer 92 will drive the encrypted data on bus 96 into the EBI 14 and will transfer the encrypted data into the off-chip memory by means of I/O 16.

When the data will be read back by the microprocessor 12, the data will be provided by the off chip memory by means of input pad buffer 18 and the EBI 14 will transfer the value onto bus 98. This value will also be provided to multiplexer 94 and also to customizable logic area 42, which will process the data to decrypt the data and will provide the resulting decrypted data onto bus 100. If multiplexer 94 selects bus 100, the system bus 34 will carry the value of multiplexer output 94 and the microprocessor will read the exact data it wrote. However, the external memory contains encrypted data.

If the encrypting/decrypting function is not required, the signal 104 can be set to inactive by clearing multiplexer control registers 102. Depending on the customer encrypting/decrypting function, which can be different for each derivative product due to the customizable logic, any OEM manufacturer can protect its intellectual property.

Figure 6:
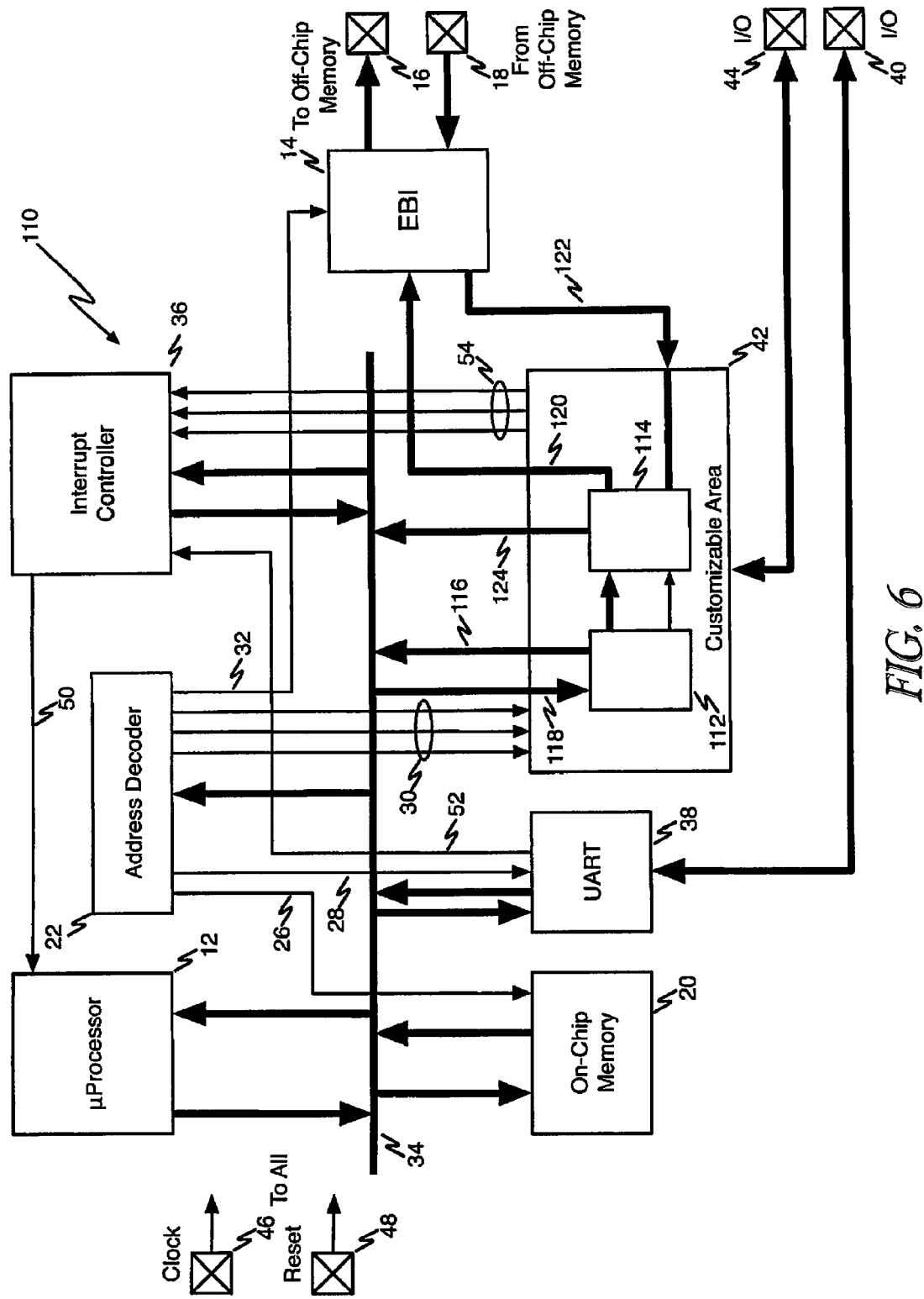
FIG. 6 is a block diagram illustrating a fifth example of an architecture according to the present invention in which the added functionality is located between the system bus and the EBI and all encrypting/decrypting logic and the multiplexers are located in the customizable logic area.

Referring now to FIG. 6, a block diagram illustrates a fifth example of an architecture according to the present invention in which the added functionality is located between the EBI and its associated I/O and all encrypting/decrypting logic and the multiplexers are located in the customizable logic area. Elements shown in FIG. 6 performing the same function as corresponding elements in FIG. 1 will be designated by the same reference numerals used for the corresponding elements in FIG. 1. A microcontroller architecture 110 includes regions 112 and 114 in the customizable logic area 42. Paths between the system bus 34 and region 112 are shown at reference numerals 116 and 118. Paths between the EBI 14 and region 114 are shown at reference numerals 120 and 122. Another path between region 114 and system bus 34 is shown at reference numeral 124. Path 124 can be seen as a duplication of path 116 but it allows having a customizable function in customizable logic area 42 together with an encrypted or non-encrypted EBI 14 that provides data to the system bus in an independent manner. Several independent circuits may be formed in customizable logic area 42, one to perform encryption/decryption in block 114 and another one performing other functionality that may be located in 112.

If the system bus is a multi-layer system bus allowing one master per system bus, the master accessing part or all the slaves, then providing path 124 allows one master (DMA for example, not shown in any figure) to access EBI 14 (which is a slave for the system bus), while another master (another DMA of the Microcontroller circuit) communicates with a USB device which is a slave for system bus and that would be located in the customizable area.

In one example of the use of the embodiment of FIG. 6, the customizable logic area 42 contains the encrypting/decrypting function in region 114 together with multiplexers to select the encrypting/decrypting function or direct path, both defined by the user. The encrypting/decrypting function is accessible by the system bus of the customizable function at reference numerals 116 and 118. The customer additional independent logic (other than encrypting/decrypting) and associated configuration registers to drive the multiplexers are also located in customizable logic area 42 and especially in region 112, whereas in other embodiments herein the multiplexers were located in the predefined circuit area outside of customizable logic area 42.

The architecture shown in FIG. 6 may help to improve the maximum frequency of the system if there is no need for a customer to employ the encrypting/decrypting function. Using the architecture of the present invention depicted in FIG. 5 where the selection is located between system bus 34 and the EBI 14, the propagation delays of the multiplexers 92 and 94 exist whatever the state of the encrypting function. If the encrypting function is disabled, the selection signal 104 is set at an inactive value and the multiplexer input from the customizable area may be hardwired to $V_{DD}$ or GND as is known in the art.

In deeper sub-micron technology, the propagation delays are not only created by the cell propagation delay but also by nets. In architectures fabricated using sub-micron technology, there may not be a significant difference between use of the embodiments of FIGS. 5 and 6.

Figure 7:
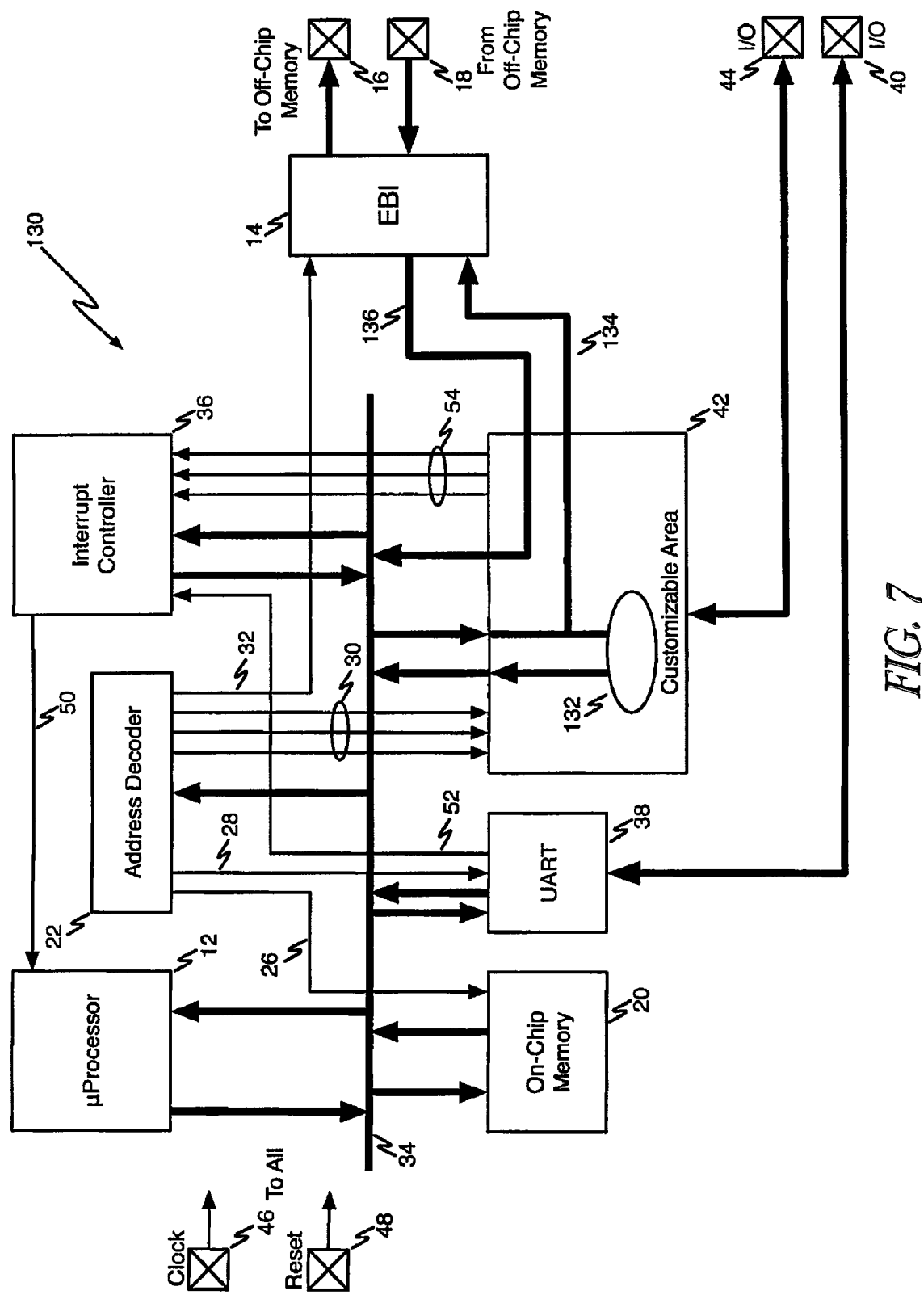
FIG. 7 is a block diagram illustrating a sixth example of an architecture according to the present invention.

Referring now to FIG. 7, a block diagram illustrates a sixth example of an architecture 130 according to the present invention in which the added functionality may be configured in the customizable logic are when the encrypting/decrypting function is not necessary. In FIG. 7, elements performing the same function as corresponding elements in FIG. 1 will be designated by the same reference numerals used for the corresponding elements in FIG. 1.

The customizable logic area 42 may contain functionality 132 accessible by microprocessor 12. The EBI 14 is directly connected to the system bus 34 by means of busses 134 and 136 located in the customizable logic area 42. Functionality 132 may comprise any functionality configured by a user and is directly connectable by nets to the EBI 14.

As will be readily understood by persons of ordinary skill in the art, the physical placement and structure for the nets employed in the customizable logic area 42 of all of the disclosed illustrative embodiments of the present invention are formed using conventional programmable circuit technology layout and routing techniques. The particular layout used in any actual system fabricated according to the present invention will be a function of the specific architecture of the system and is largely a matter of design choice.

The external bus interface used in the various embodiments of the invention disclosed herein may take many forms. It is particularly useful to configure the external bus interface as a memory controller, such as an SRAM controller, an SDRAM controller, or a non-volatile memory controller.

While embodiments and applications of this invention have been shown and described, it would be apparent to those skilled in the art that many more modifications than mentioned above are possible without departing from the inventive concepts herein. The invention, therefore, is not to be restricted except in the spirit of the appended claims.

What is claimed:

1. An integrated circuit comprising:
a predefined logic area including a microprocessor coupled to a plurality of peripheral devices over a system bus, at least one of the peripheral devices comprising an external bus interface having access to input and output buffers;
a customizable logic area accessible by the microprocessor over the system bus, the customizable logic area configured to provide at least one of scrambling and de-scrambling function, wherein the scrambling and de-scrambling function are enabled based on an instruction received through a software interface;
a first I/O bus to send data from the integrated circuit;
a second I/O bus to receive data into the integrated circuit;
a first multiplexer circuitry disposed in the predefined logic area and having a first input coupled to an output of the external bus interface via a first route, a second input coupled to the customizable logic area, wherein the second input of the first multiplexer is configured to receive scrambled data from the customizable logic area, and an output coupled to the first I/O bus, the output of the external bus interface also coupled to the first input of the first multiplexer circuitry and the customizable logic area via a second route to enable routing of data from the output of the external bus interface to the customizable logic area via the second route;
a second multiplexer circuitry disposed in the predefined logic area and having a first input coupled to the customizable logic area, wherein the first input of the second multiplexer is configured to receive de-scrambled data from the customizable logic area, a second input coupled to the second I/O bus via a third route and coupled to the customizable logic area via a fourth route, and an output coupled to an input of the external bus interface; and
a multiplexer control register coupled to the first multiplexer circuitry and second multiplexer circuitry, wherein the multiplexer control register is configured to select the output of the first multiplexer circuitry and the output of the second multiplexer circuitry based on the instruction received through the software interface.

2. The integrated circuit of claim 1 wherein the external bus interface is a memory controller.

3. The integrated circuit of claim 2 wherein the memory controller is one of an SRAM controller and an SDRAM controller.

4. The integrated circuit of claim 2 wherein the memory controller is a non-volatile memory controller.

5. An integrated circuit comprising:
a predefined logic area including a microprocessor coupled to a plurality of peripheral devices over a system bus, at least one of the peripheral devices comprising an external bus interface having access to input and output buffers;
a customizable logic area accessible by the microprocessor over the system bus, wherein the customizable logic area is configured to provide at least one of scrambling or de-scrambling functions and wherein the scrambling and de-scrambling function are enabled based on an instruction received through a software interface;
a first I/O bus to send data from the integrated circuit;
a second I/O bus to receive data into the integrated circuit;
a first bus coupling output signals from the external bus interface to the customizable logic area;
a second bus having programmable connections to the first bus in a region of the customizable logic area, the customizable logic area including a first multiplexer circuitry configured to select data from the external bus interface and the customizable logic area, wherein the selected data from the customizable logic area comprises scrambled data, and provide the selected data to the first I/O bus, the customizable logic area including a second multiplexer circuitry configured to receive data from the second I/O bus and the customizable logic area and provide the data to the external bus interface, wherein the data provided to the external bus interface comprises de-scrambled data, the second bus coupling first signals to the first I/O bus, wherein the first multiplexer circuitry selects data from the external bus interface and customizable logic area based on the instruction received through the software interface and wherein the second multiplexer circuitry selects data from the second I/O bus and customizable logic area based on the instruction received through the software interface;
a first path to route data from the external bus interface to both a first input of the first multiplexer circuitry and the customizable logic area;
a second path to route data from the customizable logic area to a second input of the first multiplexer circuitry;

a third path to route data from the second I/O bus to both a first input of the second multiplexer circuitry and the customizable logic area;
a fourth path to route data from the customizable logic area to a second input of the second multiplexer circuitry;
a third bus coupling input signals from the second I/O bus to the customizable logic area; and
a fourth bus having programmable connections to the third bus in a region of the customizable logic area, the fourth bus coupling second signals to the external bus interface.

6. The integrated circuit of claim 5 wherein the external bus interface is a memory controller.

7. The integrated circuit of claim 6 wherein the memory controller is one of an SRAM controller and an SDRAM controller.

8. The integrated circuit of claim 6 wherein the memory controller is a non-volatile memory controller.

9. An integrated circuit comprising:
a predefined logic area including a microprocessor coupled to a plurality of peripheral devices of a system bus;
a customizable logic area accessible by the microprocessor over the system bus, the customizable logic area configured to provide at least one of encrypting and decrypting function, wherein the encrypting and decrypting functions are enabled based on an instruction received through a software interface;
an external bus interface;
a first I/O bus coupled to the external bus interface to send data to an external device;
a second I/O bus coupled to the external bus interface to receive data from the external device;
a first multiplexer circuitry disposed in the predefined logic area and having a first input coupled to the system bus, a second input coupled to the customizable logic area, and an output coupled to the external bus interface, wherein the second input of the first multiplexer is configured to receive encrypted data from the customizable logic area, wherein the first multiplexer circuitry is configured to select the output based on the instruction; and
a second multiplexer circuitry disposed in the predefined logic area and having a first input coupled to the external bus interface, a second input coupled to the second I/O bus via a third route and coupled to the customizable logic area via a fourth route, and an output coupled to the system bus, the output of the second multiplexer circuitry configured to provide data to only the system bus, and wherein the first input of the second multiplexer is configured to receive decrypted data from the customizable logic area, wherein the second multiplexer circuitry is configured to select the output based on the instruction.

10. The integrated circuit of claim 9 wherein the external bus interface is a memory controller.

11. The integrated circuit of claim 10 wherein the memory controller is one of an SRAM controller and an SDRAM controller.

12. The integrated circuit of claim 10 wherein the memory controller is a non-volatile memory controller.

13. An integrated circuit comprising:
a predefined logic area including a microprocessor coupled to a plurality of peripheral devices over a system bus;
a customizable logic area accessible by the microprocessor over the system bus, wherein the customizable logic area is configured to provide at least one of encryption or decryption functions and wherein the encryption or decryption functions are enabled based on an instruction received through a software interface;
an external bus interface;
a first I/O bus coupled to the external bus interface to send data;
a second I/O bus coupled to the external bus interface to receive data;
a first bus coupling output signals from the system bus to the customizable logic area;
a second bus having connections to the first bus in the customizable logic area, the second bus coupling first signals to the external bus interface;
a third bus coupling input signals from the external bus interface to the customizable logic area, wherein the third bus and the second bus include first different paths;
a fourth bus having connections to the third bus in the customizable logic area, the fourth bus coupling second signals from a first circuit region in the customizable logic area to the system bus, the first circuit region including the encryption and decryption functions, wherein the fourth bus and the first bus include second different paths; and
a fifth bus being a duplication of the fourth bus to provide signals from a second circuit region in the customizable logic area to the system bus, wherein the first circuit region and the second circuit region have different functions.

14. The integrated circuit of claim 13 wherein the external bus interface is a memory controller.

15. The integrated circuit of claim 14 wherein the memory controller is one of an SRAM controller and an SDRAM controller.

16. The integrated circuit of claim 14 wherein the memory controller is a non-volatile memory controller.

17. The integrated circuit of claim 13 wherein:
the second bus has programmable connections to the first bus in a region of the customizable logic area where multiplexers can be configured; and
the fourth bus has programmable connections to the third bus in a region of the customizable logic area where multiplexers can be configured.

18. The integrated circuit of claim 13 wherein:
the second bus has direct connections to the first bus in the customizable logic area; and
the fourth bus has direct connections to the third bus in the customizable logic area.

19. The integrated circuit of claim 1 wherein the second input of the first multiplexer circuitry is directly coupled to the customizable logic area without coupling to the output of the second multiplexer circuitry.

20. The integrated circuit of claim 5 wherein the multiplexer circuitry is further configured to route data selected from the second I/O bus and the customizable logic to the external bus interface.

21. The integrated circuit of claim 1 wherein the first I/O bus and the second I/O bus are coupled to off-chip memory, wherein the off-chip memory is configured to store scrambled data.

* * * * *